US011652440B1

(12) United States Patent
Clark (10) Patent No.: US 11,652,440 B1
(45) Date of Patent: May 16, 2023

(54) FRAME ELEVATED AUTONOMOUS SINGLE AXIS 360 DEGREE DECLINATION SOLAR TRACKING ARRAY

(71) Applicant: Bruce E. Clark, Bowie, MD (US)

(72) Inventor: Bruce E. Clark, Bowie, MD (US)

( * ) Notice: Subject to any disclaimer, the term of this patent is extended or adjusted under 35 U.S.C. 154(b) by 0 days.

(21) Appl. No.: 17/869,510

(22) Filed: Jul. 20, 2022

Related U.S. Application Data

(60) Provisional application No. 63/319,856, filed on Mar. 15, 2022.

(51) Int. Cl.
| | |
|---|---|
| *H02S 20/32* | (2014.01) |
| *H02S 40/42* | (2014.01) |
| *H02S 30/10* | (2014.01) |
| *H02S 10/20* | (2014.01) |
| *F24S 30/428* | (2018.01) |
| *F24S 40/80* | (2018.01) |
| *F24S 30/00* | (2018.01) |
| *F24S 50/20* | (2018.01) |
| *F24S 25/10* | (2018.01) |
| *F24S 30/422* | (2018.01) |
| *F24S 30/425* | (2018.01) |

(52) U.S. Cl.
CPC ............. *H02S 20/32* (2014.12); *H02S 10/20* (2014.12); *H02S 30/10* (2014.12); *H02S 40/425* (2014.12); *F24S 25/10* (2018.05); *F24S 30/00* (2018.05); *F24S 30/422* (2018.05); *F24S 30/425* (2018.05); *F24S 30/428* (2018.05); *F24S 40/85* (2018.05); *F24S 50/20* (2018.05); *F24S 2030/19* (2018.05)

(58) Field of Classification Search
CPC .......... H02S 20/32; H02S 10/20; H02S 30/10; H02S 40/425; F24S 25/10; F24S 30/00; F24S 30/422; F24S 30/425; F24S 30/428; F24S 40/85; F24S 50/20; F24S 2030/19
See application file for complete search history.

(56) References Cited

U.S. PATENT DOCUMENTS

| | | | |
|---|---|---|---|
| 4,476,854 | A | 10/1984 | Baer |
| 4,771,764 | A | 9/1988 | Cluff |
| 5,228,924 | A | 7/1993 | Barker et al. |
| 5,851,309 | A | 12/1998 | Kousa |
| 6,563,040 | B2 | 5/2003 | Hayden et al. |
| 7,531,741 | B1 | 5/2009 | Melton et al. |
| 8,242,424 | B2 | 8/2012 | Gonzalez Moreno |
| 8,481,906 | B2 | 7/2013 | Birnie, III et al. |

(Continued)

*Primary Examiner* — Michael Y Sun
(74) *Attorney, Agent, or Firm* — Invention To Patent Services; Alex Hobson (57) ABSTRACT

An A-Frame solar panel array system is configured to produce a high amount of electrical power for a given amount of ground space with a plurality of solar panels on both a forward beam and a plurality of solar panels on a trailing beam in an elevated position above the ground. This elevated positioning enables more solar panels to be configured over a given amount of ground area. The solar panels are spaced along the trailing and forward beams with a vertical offset between the trailing and forward beams to enable sunlight to pass therethrough to enable exposure to sunlight, through the forward beam array of solar panels onto the trailing beam array of solar panels. A solar panel actuator is configured to rotate the solar panels for increasing solar panel exposure throughout the year. The solar panels may only be configured to rotate trailing/forward.

19 Claims, 10 Drawing Sheets

(56) References Cited

U.S. PATENT DOCUMENTS

| | | |
|---|---|---|
| 8,746,236 B2 | 6/2014 | Powell |
| 8,793,942 B2 | 8/2014 | Campbell et al. |
| 10,116,252 B2 | 10/2018 | Drwal |
| 10,615,738 B2 | 4/2020 | Sgarrella |
| 2008/0236058 A1* | 10/2008 | Antonie .............. F24F 7/00 |
| | | 52/302.1 |
| 2010/0043851 A1* | 2/2010 | Levy .............. H02S 40/10 |
| | | 136/244 |
| 2010/0051086 A1 | 3/2010 | Vaaler et al. |
| 2010/0314509 A1 | 12/2010 | Conger |
| 2011/0094503 A1 | 4/2011 | Jones et al. |
| 2011/0290306 A1 | 12/2011 | Roberts |
| 2014/0020308 A1* | 1/2014 | Heisler .............. F24S 25/61 |
| | | 52/90.1 |
| 2018/0026579 A1* | 1/2018 | Kania .............. H02S 20/32 |
| | | 136/248 |
| 2018/0294767 A1* | 10/2018 | Forrest .............. H02S 20/32 |
| 2019/0372514 A1* | 12/2019 | Almy .............. F24S 25/617 |

* cited by examiner

FRAME ELEVATED AUTONOMOUS SINGLE AXIS 360 DEGREE DECLINATION SOLAR TRACKING ARRAY

CROSS REFERENCE TO RELATED APPLICATIONS

This application claims the benefit of priority to U.S. provisional patent application No. 63/319,856, filed on Mar. 15, 2022; the entirety of which is hereby incorporated by reference herein.

BACKGROUND OF THE INVENTION

Field of the Invention

The invention relates to an A-Frame solar panel array system that includes an A-Frame configured to retain a plurality of solar panels in an elevated position from the ground on both a forward beam, a beam more proximal the sun, and a trailing beam, a beam distal the forward beam from the sun, wherein solar panels are spaced from the trailing and forward beams, a vertical offset to enable sunlight to pass therethrough to enable exposure to sunlight, and a solar panel actuator configured to rotate the solar panels for increasing solar panel exposure throughout the year.

Background

Solar panel systems often employ a number of individual solar panels configured on the ground. The solar panels may be configured to move to track the sun and the ground array takes up a lot of area.

SUMMARY OF THE INVENTION

The invention is directed to an A-Frame solar panel array system that is configured to produce a high amount of electrical power for a given amount of ground space. The A-Frame solar panel array system utilizes an A-Frame that retains a plurality of solar panels on both a forward beam and a trailing beam in an elevated position above the ground. The forward beam is configured to extend toward the sun, or south when the A-Frame solar panel array system is configured in the northern hemisphere and the sun is configured to the south of the A-Frame solar panel array system. The trailing beam extends away from the forward beam and solar panels configured thereon may receive trailing sunlight, sunlight that has passed by the forward beam and the solar panels configured thereon. This elevated positioning enables more solar panels to be configured over a given amount of ground area. The solar panels are spaced along the trailing and forward beams with a vertical offset between the trailing and forward beams to enable sunlight to pass therethrough to enable exposure to sunlight, through the forward beam array of solar panels onto the trailing beam array of solar panels. A solar panel actuator is configured to rotate the solar panels for increasing solar panel exposure throughout the year. The solar panels may only be configured to rotate trailing/forward. The forward beam, trailing beam and center beam may be referred to herein a poles, such as forward pole, trailing pole and center pole as they may be configured in a ground surface and extend up from said ground surface or ground structure, such as a cement pad.

An A-Frame solar panel array system has panel-supports that couple the solar panels to the forward and trailing beams. The panel-supports may be an extension of the solar panel actuator that rotates the solar panels or it may be driven by the solar panel actuator by an actuator-support drive, such as a gear or belt.

An A-Frame of the A-Frame solar panel array system has a forward beam that extends from a base to a top and a trailing beam that extends from a base to a top and wherein each of the trailing and forward beams extend at a frame angle with respect to vertical or a vertical axis. The frame angle may be about 15 degrees or more, about 20 degrees or more, about 25 degrees or more, about 30 degrees or more, about 40 degrees or more and any range between and including the angles provided, such as from about 40 degrees to about 15 degrees. The A-Frame provides support for securing the solar panels in an elevated position above the ground. The top of the forward and trailing beams may be coupled together, or they may be coupled together proximal to the top of the beams, such as within about 20% of the length of the beam from the top of either of the forward or trailing beams. A center beam may also be employed for additional support, wherein a center beam is configured between the trailing and forward beams and extend vertically up from the ground to couple with both the trailing and forward beams. A center beam may also be used for retaining other components of the systems, such as batteries, auxiliary power generators, meteorological device and the like.

An A-Frame may be sized for a given application, or may be sized to provide a space between the base of the trailing and forward beams for other objects, machines, dwellings, roadways, and the like. The width of an A-Frame from the base of the trailing and forward beams may be about 3 m or more, about 4 m or more, about 6 m or more, about 10 m or more, about 20 m or more and any range between and including the width values provided. The width may be scaled with a height and the height of an A-Frame may be about 3 m or more, about 4 m or more, about 6 m or more, about 10 m or more, about 20 m or more and any range between and including the height values provided. The open space between the trailing beams and the forward beams enables dual use, referred to as "Agrivoltaics" panels can improve soil productivity in hot climates. Increase income for farms, shade for grazing animals, etc. As described herein, this open space may be large enough for effective use.

An A-Frame may be configured to retain a plurality of solar panels on each of the trailing and forward beams, such as two or more, three or more, four or more, five or more, eight or more, ten or more and any range between and including the number of solar panels provided. The number of solar panels coupled with each of the trailing and forward beams will depend on the application and the size constraints or length of the trailing and forward beams with respect to the size of the solar panels.

The solar panels on the trailing and or forward beams, may be rotated by an individual solar panel actuator, wherein each solar panel has a dedicated solar panel actuator, or a single solar panel actuator may be configured to move a plurality of solar panels on a beam, or both beams. A solar panel actuator may have an actuator-support device that couples the solar panel actuator with the solar panel, such as a gear or a belt, for example. A gear may drive a shaft having teeth this shaft may extend to two or more solar panels wherein teeth engage with gears to drive each of the solar panels. Likewise, a belt may be configured to extend from a solar panel actuator, such as an electric motor, or stepper motor, to two or more solar panels.

The solar panels may be actuated to track the sun daily, wherein the panels are actuated throughout the day to maximize the sun exposure and electrical power production. Optionally, the solar panel may be actuated periodically, such as from one day to another, or every week or month as required as the sun changes position in the sky throughout the year. The solar panels may be actuated by the motor or motors as described herein or they may be actuated manually. For example, the solar panels may be actuated manually every few weeks as the sun changes position in the sky. Also, additional panels may be fixed to the vertical poles facing orthogonal to the width axis of the A-frame, or east or west when the forward and trailing beams extend along a north/south axis, to provide additional power generation during the morning and late afternoon of the spring and fall seasons.

The solar panels may be adjusted in position to allow more or less sun to pass through to the space between the forward and trailing solar panels. It may be desirable to adjust the solar panels to allow more sunlight to pass through to the space between the solar panels in the morning to prevent mold formation from dew or to provide sunlight to plants, such as a crop or agricultural plant. It may be desirable to adjust the panels in the hotter afternoons to prevent the plants from getting too much sun and to reduce the temperature for occupants, equipment or building configured within the A-Frame array or between the forward and trailing beams.

An A-Frame solar panel array system may include an A-Frame array that has a plurality of A-Frames with panel-supports extending between the plurality of A-frames. The solar panels of adjacent A-Frames may be coupled the same panel-support and this panel-support may be rotated by a single solar panel actuator, thereby enabling rotation of a plurality of solar panels by rotating the panel-support. A panel-support may be a shaft or rod and solar panel actuator may spin the shaft to increase sun exposure of the solar panels. An A-Frame array may include two or more, three or more, four or more, five or more, ten or more, or even twenty or more A-Frames. Note that other additional supports may extend between the center beams, or vertical supports to provide additional structural integrity for the A-frame solar panel array. The forward panel-supports and trailing panel-supports may also provide structural support between the center beams as they extend across two or more of the center beams.

An A-Frame solar panel array system may include an auxiliary electrical power generator, such as a fuel powered generator, or a wind turbine that may be configured proximal to the top of the A-Frame for increased wind exposure. The A-Frame solar panel array system may also comprise batteries that are grid tied to support the public power grid. The batteries may store electrical energy that may be used to power components of the A-Frame solar panel array system for control. The batteries may be used to provide power during night time hours or when the solar panels are not generating power from the sun.

An A-Frame solar panel array system may include a meteorological device that monitors the weather conditions and when bad weather is expected, a controller of the A-Frame solar panel array system may rotate the solar panels to prevent damage. This monitoring and movement of the panels may be done automatically without user input. For example, if heavy rain and hail is predicted or sensed, the A-Frame solar panel array system may rotate the solar panels such that a top side, the side with the photovoltaic cells, is substantially vertical to prevent impact from the hail. Likewise, when high winds are predicted, or sensed by the A-Frame solar panel array system, the controller may turn the panels to prevent wind exposure and minimize force from the wind on the panels, such as by turning the panels to a substantially horizontal orientation, for example. The A-Frame solar panel array system may receive weather reports through any conventional means, such as through a wireless transceiver and the controller may take action as a result of these reports to prevent damage and reduce forces on the panels. Also, when high cloud cover is forecasted, the system may store more power in batteries for providing this stored power as required during low electrical power generation periods.

An A-Frame solar panel array system may include mister system configured to produce a water mist over the solar panel array to reduce the temperature of the solar panels for more effective power generation. A water source, such as a tank or a connection to a water supply, provides water to a pump that pumps the water through a water conduit to the mister ports. If the water supply is pressurized, such as from a municipal water supply, then a pump may not be required. In remote locations, a water tank and pump may be required and the pump may be powered by electricity produced by the A-Frame solar panel array system, such as from a battery. The water conduits and mister ports are supported by a mister support frame that is coupled with the A-frame, such as to the center beam and/or the forward beam and trailing beam. As described herein, solar panels lose some efficiency at high temperatures and a mister system may provide evaporative cooling and may also help to remove dust, pollen and other debris from the surface of the solar panels. A controller may receive a temperature measurement from a temperature sensor that measures the ambient temperature or the temperature of the solar panels and may direct the mister system to produce water mist when the temperature exceeds a threshold temperature.

It is to be understood that in the norther hemisphere the forward beam may extend south, or have a length or length axis that is substantially aligned with south, within about 20 degrees of south, and the trailing beam may extend north, or have a length or length axis that is substantially aligned with north, within about 20 degrees of north. Likewise, in the southern hemisphere the forward beam may extend north, or have a length or length axis that is substantially aligned with north, within about 20 degrees of north, and the trailing beam may extend south, or have a length or length axis that is substantially aligned with south, within about 20 degrees of south.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
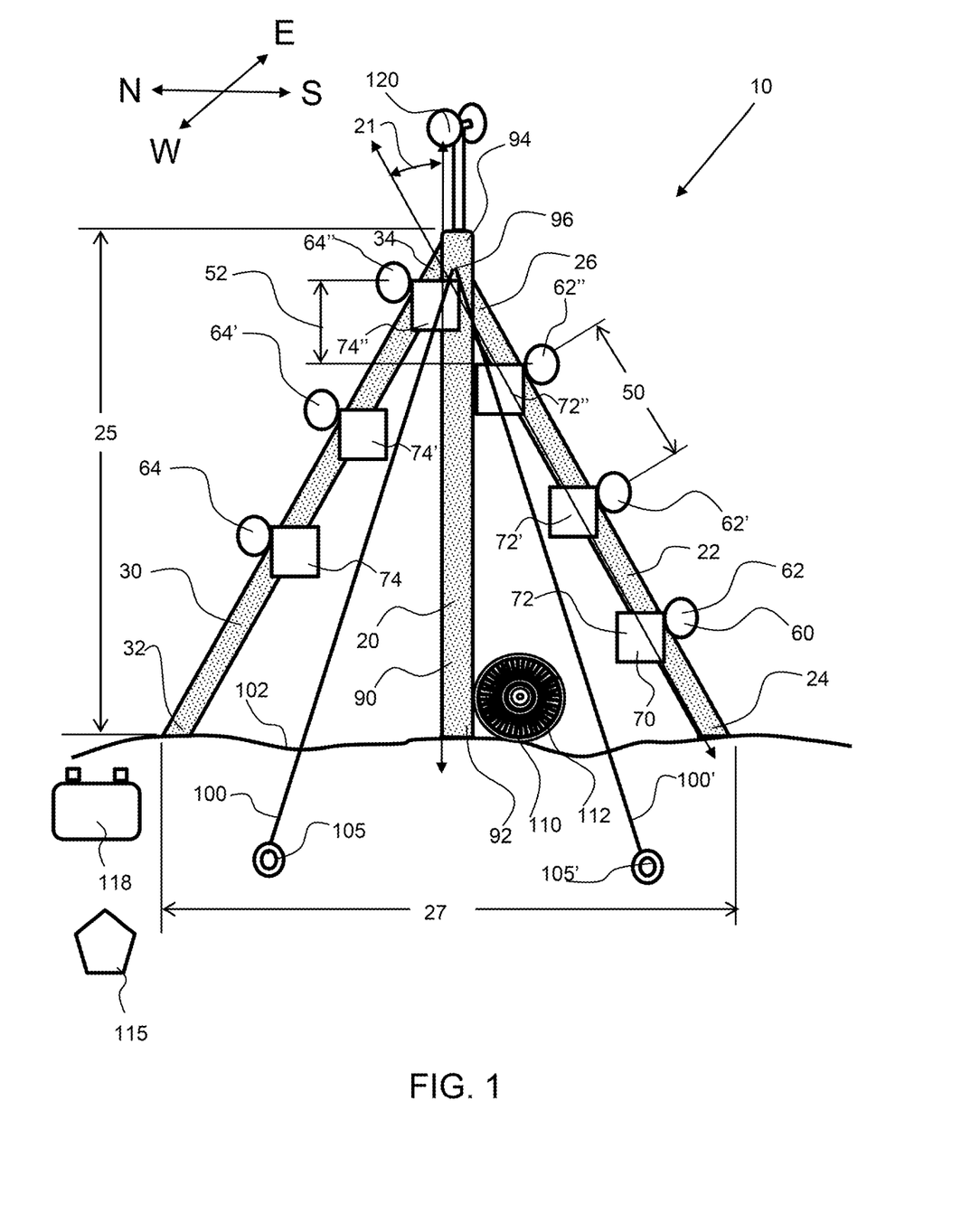
FIG. 1 shows side view of an A-Frame solar panel array system having an A-frame formed by a forward beam and a trailing beam, each having panel supports for supporting solar panels.

As shown in FIG. 1 an A-Frame solar panel array system 10 includes an A-frame 20 formed by a forward beam 22 and a trailing beam 30, each having panel-supports 60 to 60"'", for supporting solar panels (not shown). The forward beam 22 extends from a base 24 to a top 26 and the trailing beam 30 extends from a base 32 to a top 24. The tops of the trailing and forward beam are elevated and coupled together, either directly or via a center beam 90, that extend vertically from a base 92 to a top 94. The coupler 96 of the beams may be proximal to the top of the center beam. One or more cables 100, 100' may be configured to extend from an elevated position along one or more of the beams and to an anchor, such as an anchor 105, 105' in the ground 102. The A-frame 20 has a height 25 and a width 27 from the base of the forward beam to the trailing beam. The frame angle 21 is the angle of the forward beam and/or trailing beam with respect to a vertical axis or as shown to the center beam 90 that extends vertically.

Each of the trailing and forward beams has a plurality of panel-supports 60, wherein the forward beam 22 has forward panel-supports 62, 62' and 62" configured along the length of the forward beam with a beam-offset distance 50 between them. Likewise, the trailing beam 30 has trailing panel-supports 64, 64', and 64", configured along the length of the trailing beam with a beam-offset distance between them. As shown, the panel-supports of the trailing beam are configured a vertical offset distance 52 from the panel-supports of the forward beam, to ensure effective sun exposure to the solar panels. Solar panel actuators 70 are configured on each of the forward and trailing beams. The forward beam has solar panel actuators 70, 70' and 70" configured along the length of the forward beam. The trailing beam has solar panel actuators 72, 72' and 72" configured along the length of the trailing beam. The solar panel actuators are configured to rotate or tilt the solar panels in the trailing-forward axis for effective sun exposure.

The A-Frame solar panel array system also has an auxiliary power generator 110, such as a turbine 112, that may be used to produce power and may be a renewable electrical power generator, producing power from the wind, for example. Also, a meteorological device 120 to measure weather conditions, such as wind speed, for example.

Figure 2:
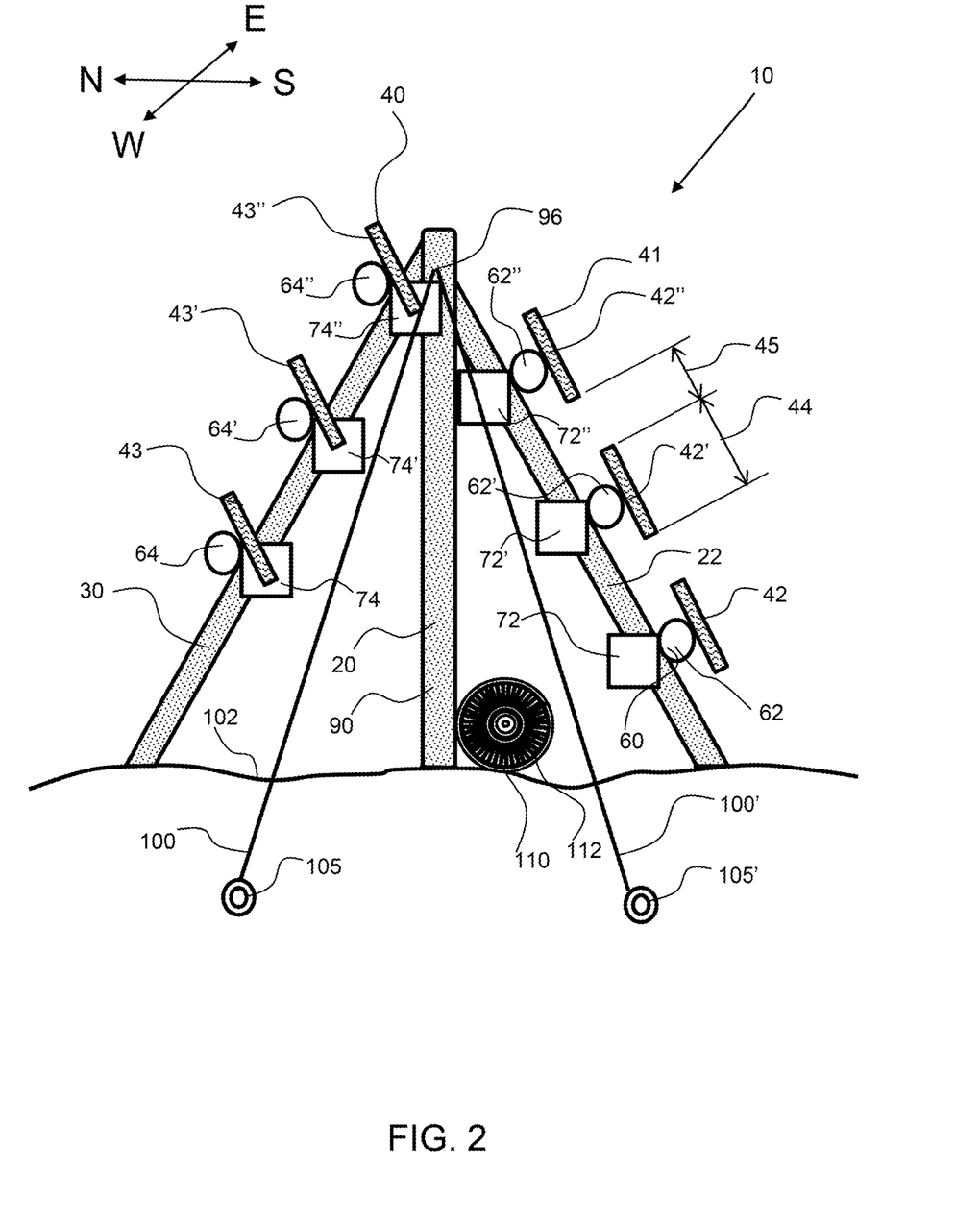
FIG. 2, shows a side view of an A-Frame solar panel array system comprising an A-frame with the solar panels attached to the panel supports, wherein the solar panels are configured in an elevated position from the ground.

As shown in FIG. 2, an A-Frame solar panel array system 10 comprises an A-frame 20 with the solar panels 41 attached to the panel supports 60. The forward solar panels 42, 42', 42" are configured in an elevated position from the ground on forward panel-supports 62, 62', 62" and are actuated by forward solar panel actuators 72, 72', 72", respectively. Likewise, the trailing solar panels 43, 43', 43" are configured in an elevated position from the ground on trailing panel-supports 64, 64', 64" and are actuated by trailing solar panel actuators 74, 74', 74", respectively. The solar panels have a solar panel height 44 and a solar panel gap offset 45, to allow sunlight to pass therethrough, from the forward solar panels to the trailing solar panels, for example. The solar panel height of the forward solar panels may be substantially the same as the solar panel height of the trailing solar panels, or within about 25% and preferably within about 10% of the same height.

Figure 3:
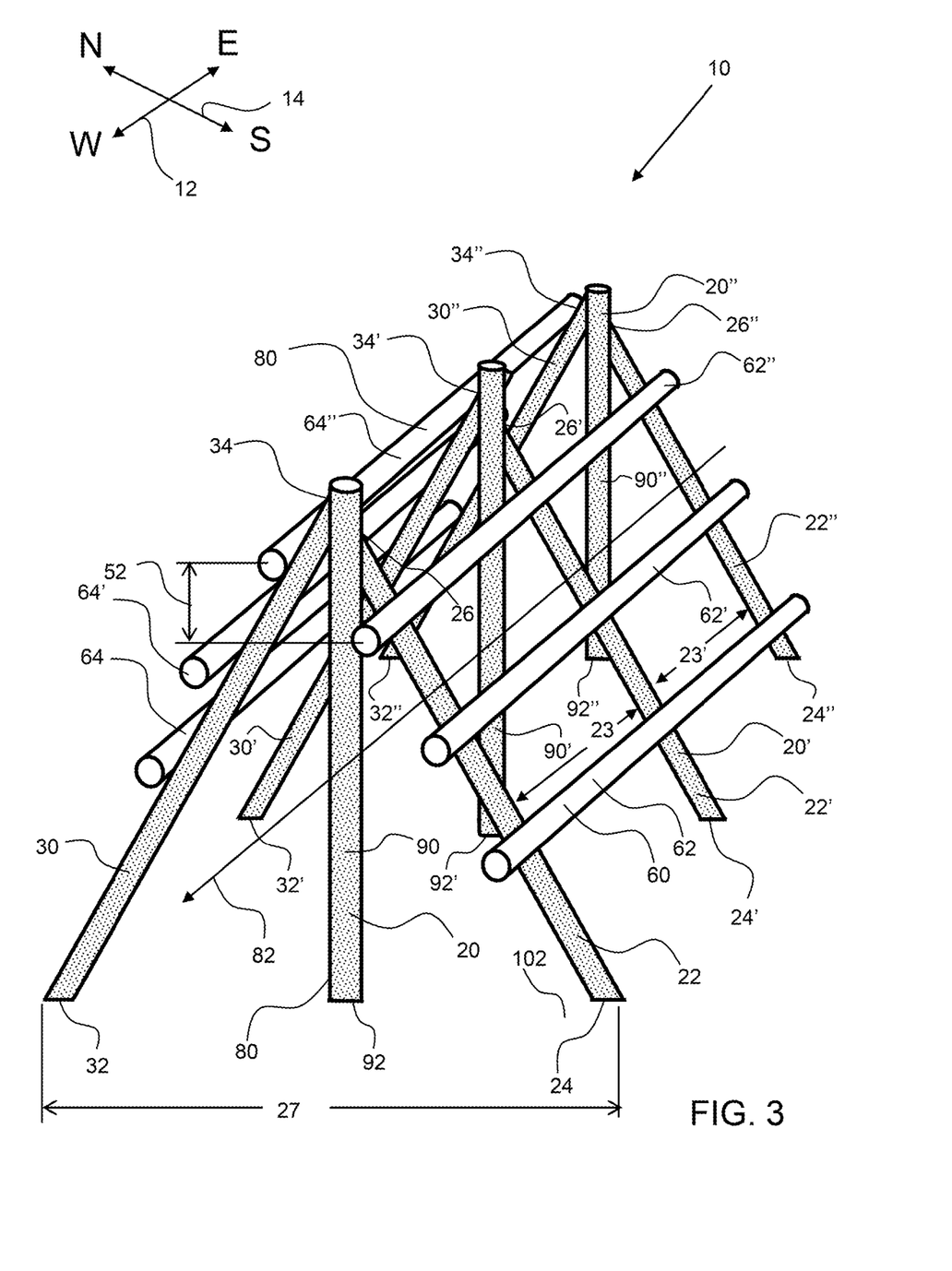
FIG. 3 shows a perspective view of an A-Frame solar panel array system having a A-frame array comprising a plurality of A-frames coupled together by panel-supports, wherein the panel supports for supporting solar panels extends horizontally across a plurality of A-frames.
Figure 4:
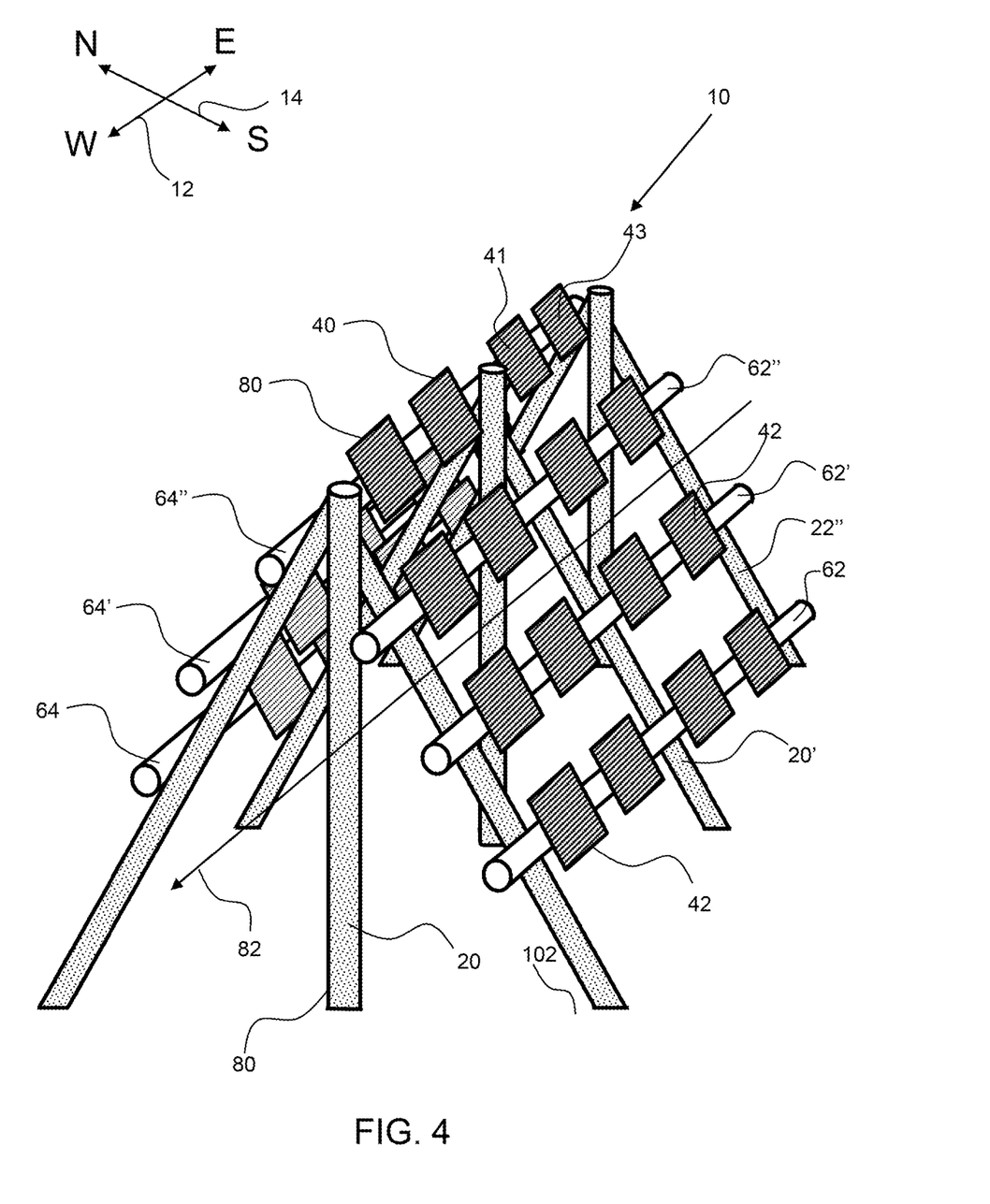
FIG. 4 shows a perspective view of an A-Frame solar panel array system having solar panels coupled to the panel supports of the A-Frame array.

Referring now to FIGS. 3 and 4, an A-Frame solar panel array system 10 has a plurality of A-frames 20, 20' 20"

coupled together in an A-frame array 80. Each of the A-frames are configured an offset distance from each other along a length axis 82. The length axis extends substantially orthogonal to the forward and trailing beams, such as east to west (within 20 degrees or orthogonal) or substantially orthogonal to the width 27 of the A-frames. A-frame 20' is configured an offset distance 23 from A-frame 20 and A-frame 20" is configured an offset distance 23' from A-frame 20'. The A-frames are coupled together by panel-supports 60, wherein the panel supports for supporting solar panels extends horizontally across a plurality of A-frames and also parallel with the length axis. The forward beams 22, 22', 22" of the A-frames have forward panel-supports 62, 62' and 62" extending across and to each of the forward beams of the A-frames, respectively. The forward panel-supports extend in a length axis 82 of the A-frame array 80. Likewise, the trailing beams 30, 30', 30" of the A-frames have trailing panel-supports 64, 64', 64" extending across each of the trailing beams of the A-frames, respectively. The trailing panel-supports extend in a length axis 82 of the A-frame array 80. As shown, the panel-supports of the trailing beam are configured a vertical offset distance 52 from the panel-supports of the forward beam, to ensure effective sun exposure to the solar panels.

As shown in FIG. 3, the trailing beams 30, 30', 30" extend from a base 32, 32', 32" to a top 34, 34', 34" wherein the top, or proximal the top, is coupled with the center beams 90, 90', 90" that extend vertically from the base 92', 92', 92" to the top 94, 94', 94" respectively. Likewise, the forward beams 22, 22', 22" extend from a base 24, 24', 24" to a top 26, 26', 26" wherein the top, or proximal the top, is coupled with the center beams 90, 90', 90" that extend vertically from the base 92', 92', 92" to the top 94, 94', 94" respectively. Note that one of the north or south beams may be attached to the center beam and the other of the north and south beam may be coupled thereto.

As shown in FIG. 4, this vertical offset distance 52 of the panel-supports enables sunlight to pass through the forward solar panels and be incident on the trailing solar panels. This configuration of an array of solar panels 40 effectively produces power from sunlight. Note that in the forward hemisphere, the sunlight may pass through the trailing solar panels and be incident on the forward solar panels. As shown, the length axis 82 of the A-frame array 80 is substantially aligned with an east-west axis 12, and the length of the forward beams and trailing beams extend substantially along the north-south axis 14, or within about 20 degrees, as described herein. This is a representation when the A-Frame solar panel array system is configured in the northern hemisphere with the south to the south.

Figure 5:
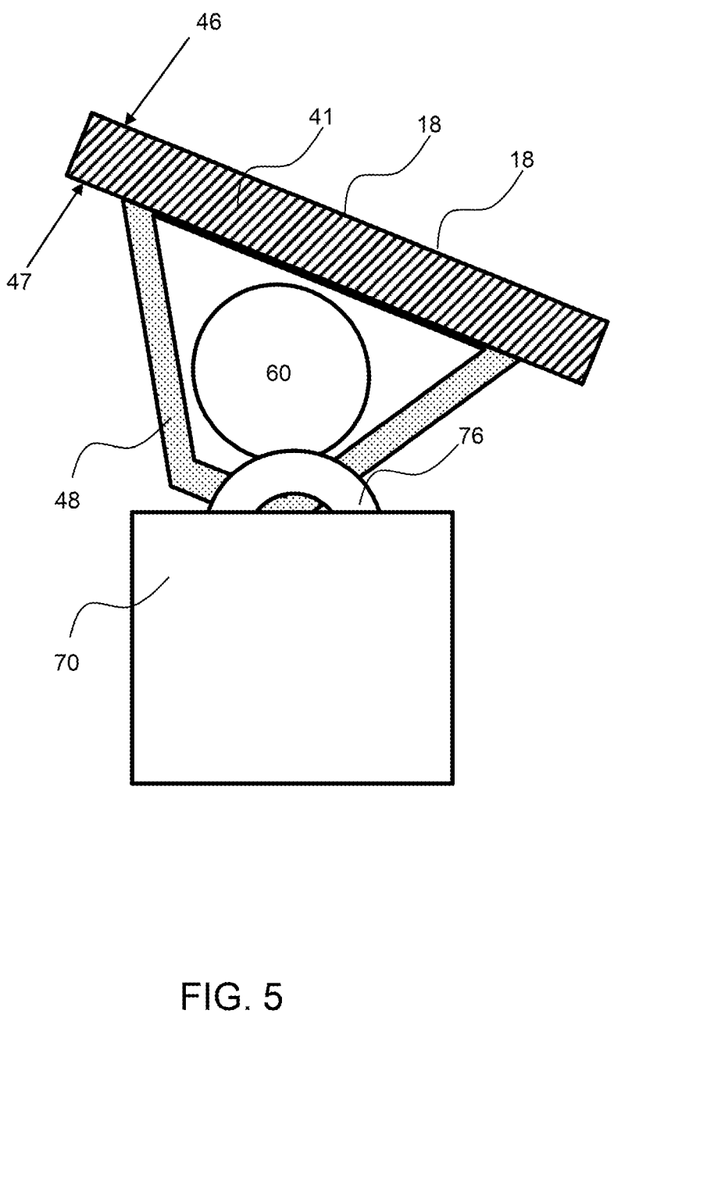
FIG. 5 shows an end view of a panel-support having a panel coupler configured to couple the solar panel to the panel-support.

As shown in FIG. 5, a panel coupler 48 couples the panel-support 60 with the solar panel 41. The solar panel having a top side 46, having the photovoltaic cell 18 exposure and a bottom side 47. The solar panel actuator 70 is configured to rotate or tilt the solar panel by coupling with the panel coupler, or directly with the panel support 60. An actuator-support drive 76, such as a gear or a belt is configured to couple with and tilt the solar panel.

Figure 6:
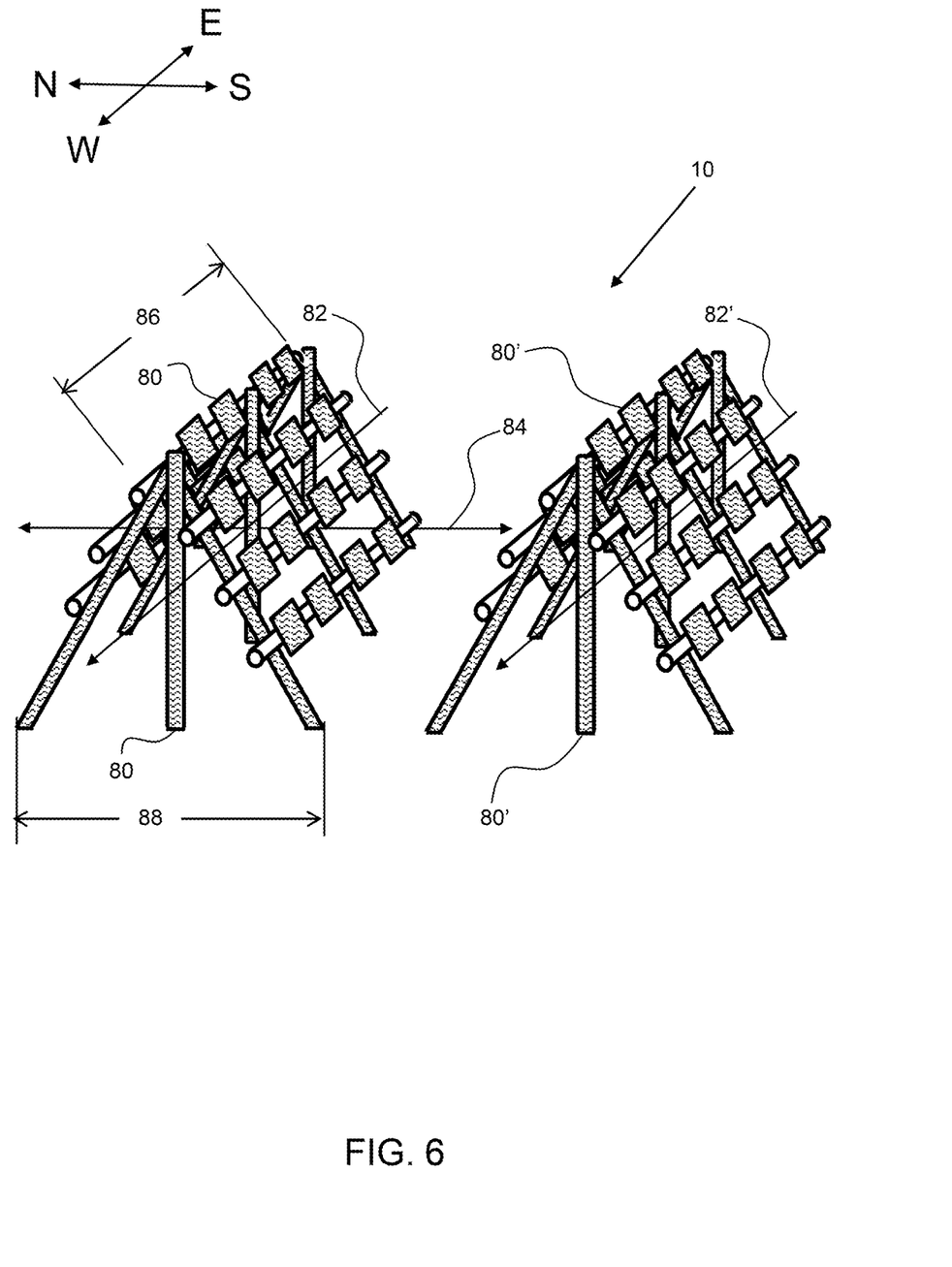
FIG. 6 shows a perspective view of an A-Frame solar panel array system having two A-Frame arrays.

As shown in FIG. 6, an A-Frame solar panel array system 10 has two A-Frame arrays 80, 80'. A-Frame array 80 has a length 86 and a width 88 along the width axis 84. The length is measure along the length axis 82 which extends substantially along the east-west axis 12. The width extends substantially in the north-south axis 14. Any number of A-Frame arrays may be configured in an area to produce power.

Figure 7:
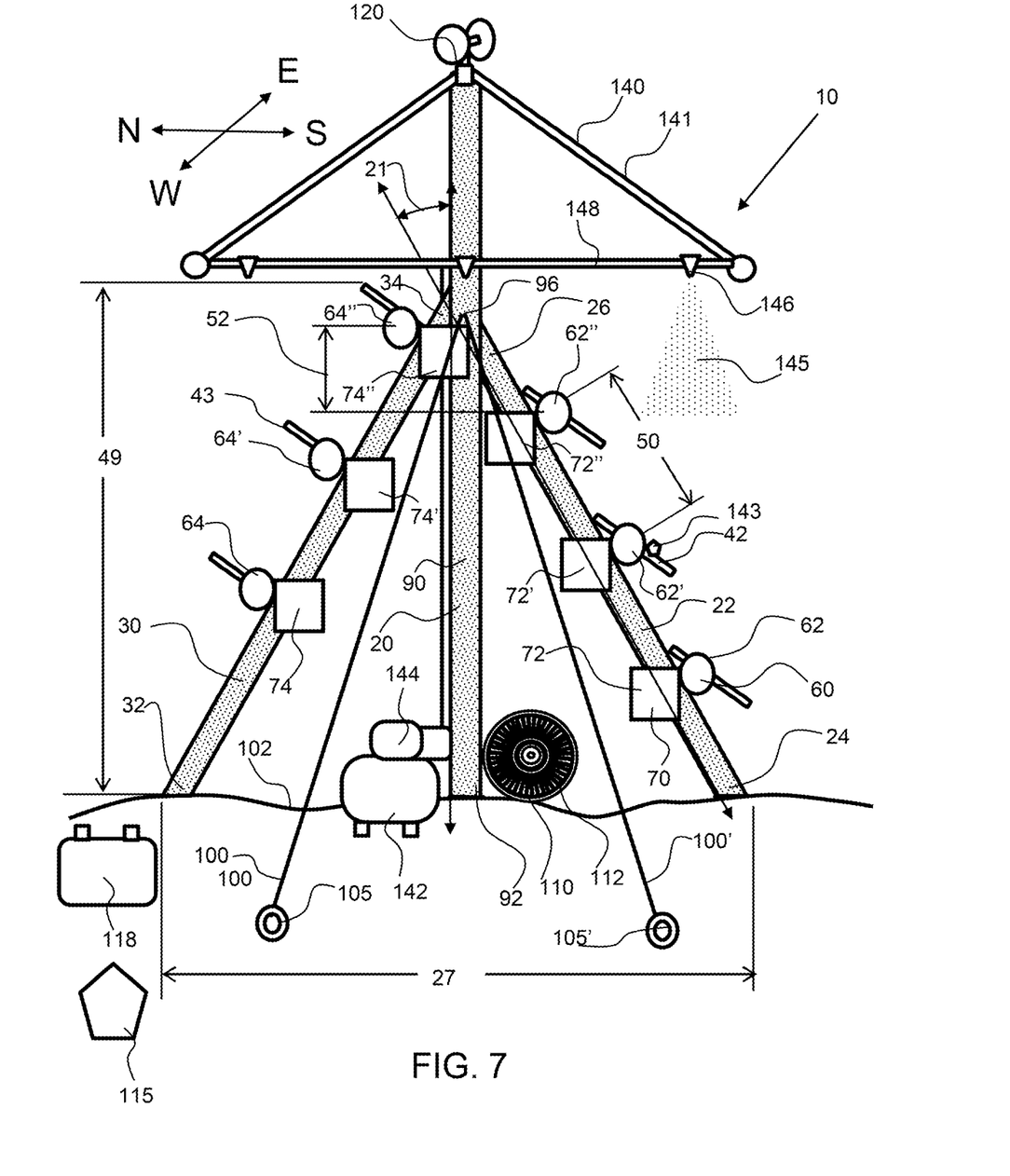
FIG. 7 shows a side view of an A-Frame solar panel array system having an A-frame formed by a forward beam and a trailing beam, each having panel supports for supporting solar panels, and a mister system configured to produce a mist of water over the solar panel array to reduce the temperature of the solar panels for more effective power generation.
Figure 8:
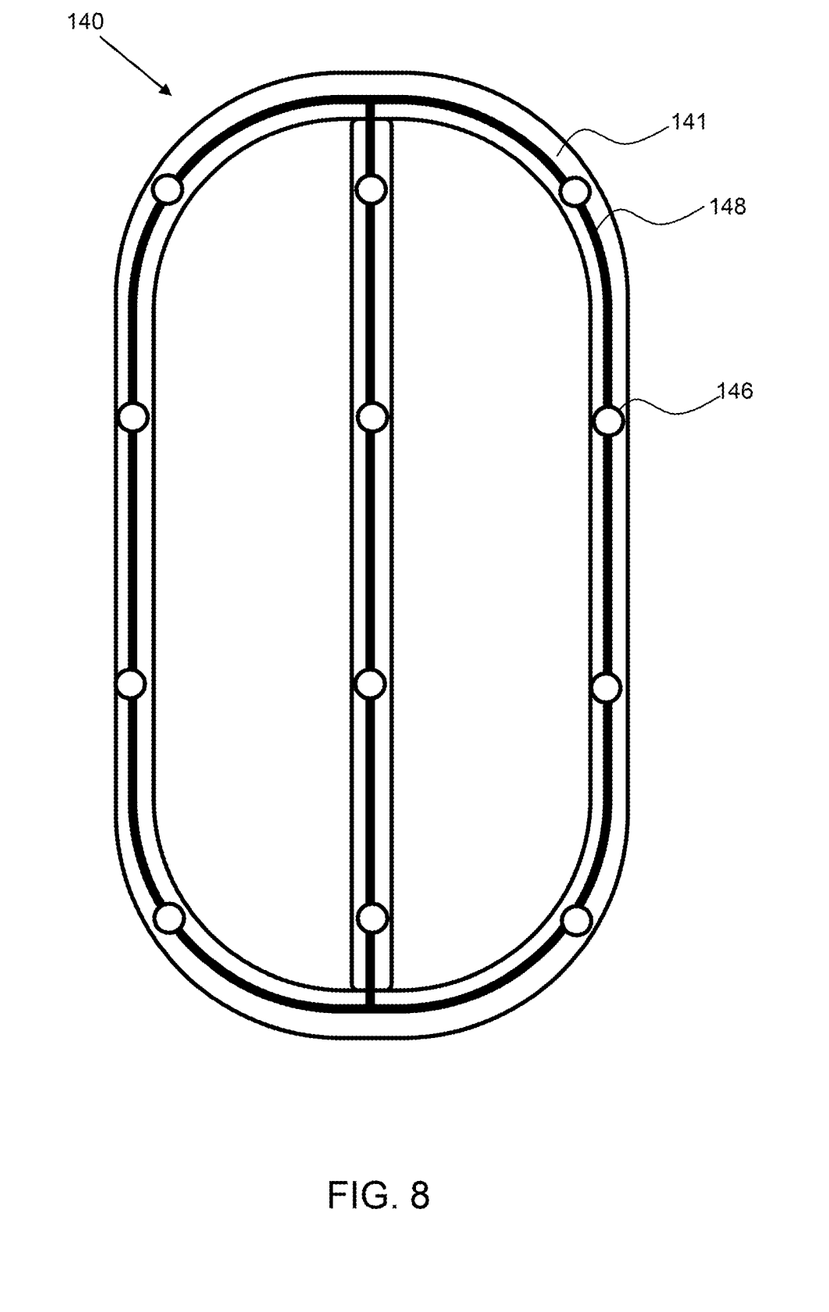
FIG. 8 shows a bottom view of a mister support frame forming an outer perimeter frame with a plurality of mister ports attached thereto.

Referring now to FIGS. 7 and 8, an A-Frame solar panel array system 10 includes an A-frame 20 formed by a forward beam 22 and a trailing beam 30, each having panel-supports 60, for supporting solar panels (not shown). The forward beam 22 extends from a base 24 to a top 26 and the trailing beam 30 extends from a base 32 to a top 24. The tops of the trailing and forward beam are elevated and coupled together, either directly or via a center beam 90, that extend vertically from a base 92 to a top 94. The coupler 96 of the beams may be proximal to the top of the center beam. One or more cables 100, 100' may be configured to extend from an elevated position along one or more of the beams and to an anchor, such as an anchor 105, 105' in the ground 102.

The A-Frame solar panel array system 10 has a plurality of forward solar panels 42 configured on the forward panel supports 62 and a plurality of trailing solar panels 43 configured on trailing panel supports 64. The A-Frame solar panel array system has mister system 140 configured to produce a water mist 145 over the solar panel array to reduce the temperature of the solar panels for more effective power generation. A water source 142, such as a tank or a connection to a water supply, provides water to the water pump 144 that pumps the water through a water conduit 148 to the mister ports 146. The water conduits and mister ports are supported by a mister support frame 141 that is coupled with the A-frame 20, such as to the center beam 90 and/or the forward beam 22 and trailing beam 30. As described herein, solar panels lose some efficiency at high temperatures and a mister system may provide evaporative cooling and may also help to remove dust, pollen and other debris from the surface of the solar panels. The water pump 144 may be an electric pump that receives electrical power from the A-Frame solar panel array system, such as from a battery 118 which may be charged by electrical power produced by the solar panels.

The mister system may be configured to produce water mist 145 when the temperature gets too hot. A controller 115 may receive a temperature measurement from a temperature sensor 143 that measures the ambient temperature or the temperature of the solar panels and may direct the mister system to produce water mist when the temperature exceeds a threshold temperature.

As shown in FIG. 8 the mister system 140 has a support frame 141 with a center extension and an outer perimeter with a plurality of mister ports 146 attached thereto. A water conduit 148 extends to each of the mister ports to provide a supply of water to produce the water mist. The outer perimeter of the support frame may extend out from the center beam and over both the forward and trailing solar panels.

Figure 9:
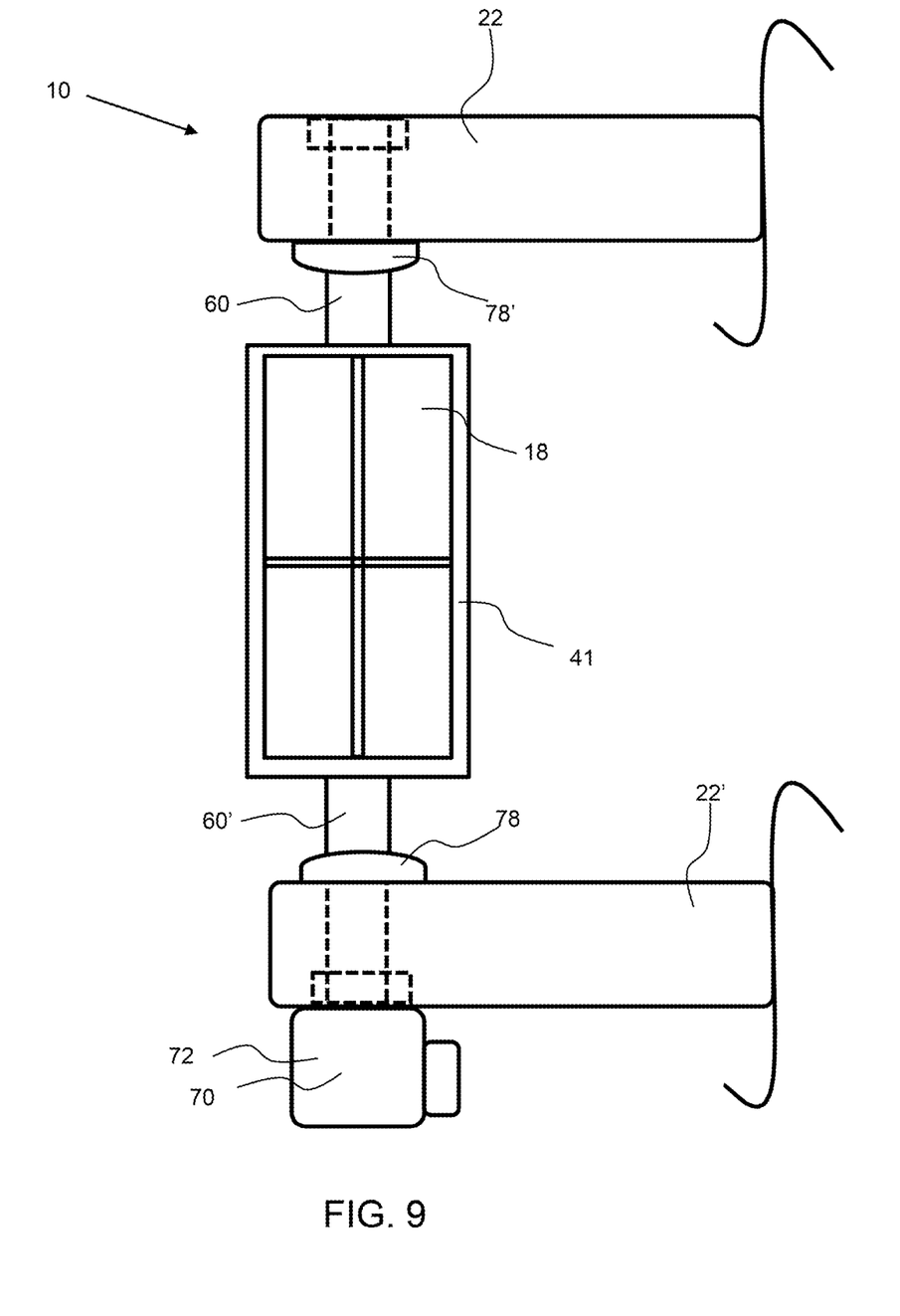
FIG. 9 shows a forward solar panel coupled to a forward panel support between two forward beams.

As shown in FIG. 9, a solar panel 41 is coupled to panel supports 60, 60', which may be a single extension from the forward beams 22, 22'. The solar panel 41 may have a plurality of photovoltaic cells 18. The solar panel may be rotated by the solar panel actuator 70, the forward solar panel actuator 72 as shown. The solar panel actuator may be an electric motor coupled with the panel support. A plurality of bearings 78, 78' may be configured to allow rotation of the panel support by the electric motor.

Figure 10:
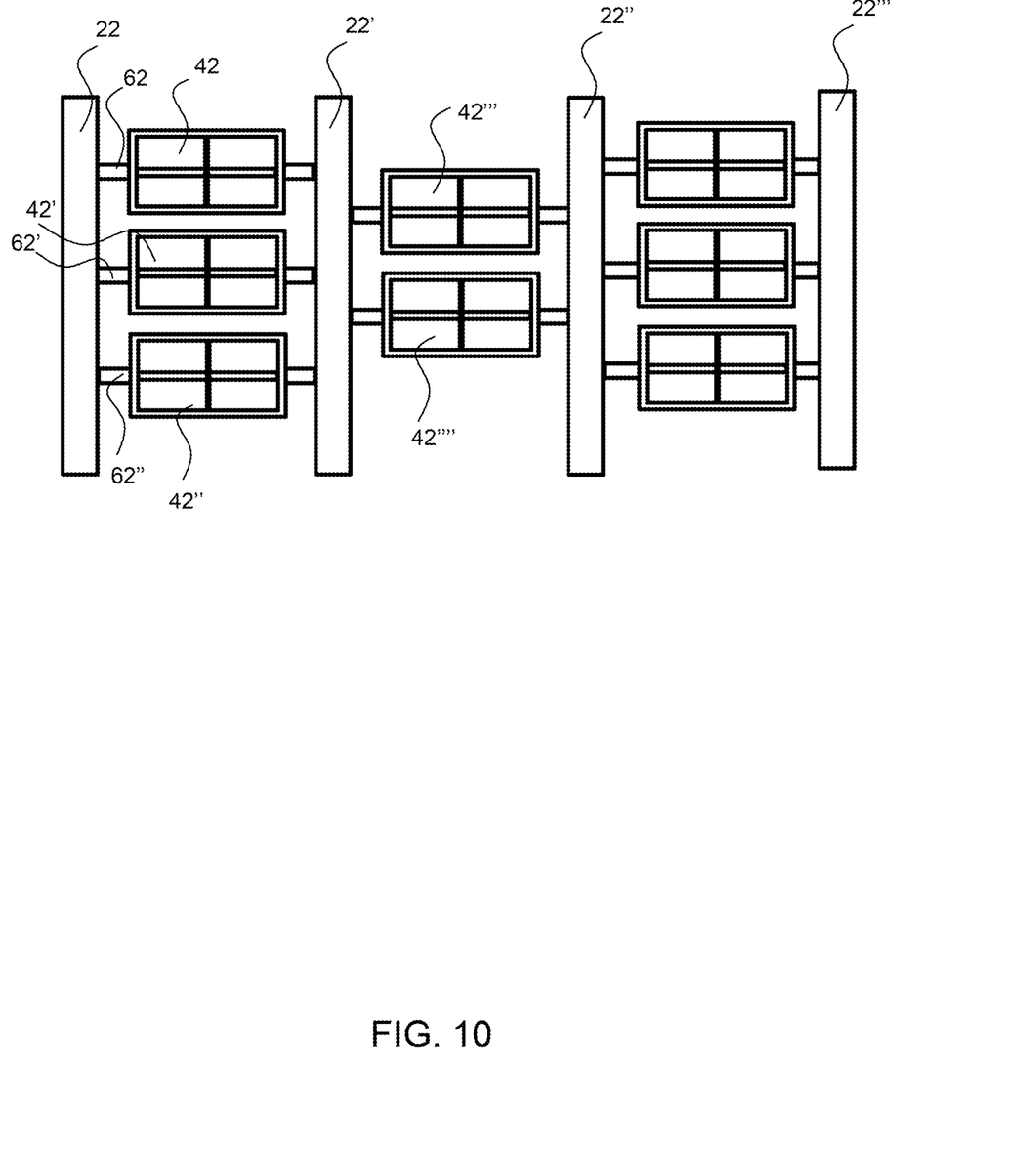
FIG. 10 shows an array of forward solar panels configured between forward beams, wherein three solar panels are configured on the ends of the array of forward solar panels and two solar panels are configured between the end arrays.

As shown in FIG. 10, an array of forward solar panels 42 is configured between forward beams 22, 22', 22" and 22''', with three forward solar panels 42, 42' and 42" configured on the ends of the array of forward solar panels and two forward solar panels 42''' and 42'''' configured between the end arrays on in a center array between forward beams 22' and 22". Each solar panel is coupled to a forward panel support 62 that extends between the adjacent forward beams. This alternating configuration may be reversed on the array of trailing solar panels 62, wherein there are only two trailing solar panels on the ends and three trailing solar panels configured in a center array. This alternating configuration being reversed from the trailing to the forward solar panel arrays may provide better sun exposure.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An A-Frame solar panel array system comprising:
   a) an A-Frame comprising:
      i) a forward beam extending from a base to a top;
      ii) a trailing beam extending from a base to a top, and coupled to said forward beam proximal to said top of the forward beam;
      wherein the base of the forward beam is configured a width from the base of the trailing beam and wherein the base of the forward beam is configured forward from the trailing beam;
   b) panel-supports; and
   c) a solar panel array comprising:
      iii) a plurality of forward solar panels coupled to the forward beam between the base and the top of the forward beam;
      wherein each of said plurality of forward solar panels are coupled to the forward beam by one of said panel-supports and with a beam-offset distance, wherein a first forward solar panel is configured a beam-offset distance from a second forward solar panel of said plurality of forward solar panels; and
      iv) a plurality of trailing solar panels coupled to the trailing beam between the base and the top of the trailing beam; and
      wherein each of said plurality of trailing solar panels are coupled to the trailing beam by one of said panel-supports and with a beam-offset distance, wherein a first trailing solar panel is configured a beam-offset distance from a second trailing solar panel of said plurality of trailing solar panels; and
      wherein the plurality of forward solar panels are configured a vertical offset distance from the plurality of trailing solar panels to allow light to pass through a beam-offset distance of the plurality of forward solar panels to the plurality of trailing solar panels.

2. An A-Frame solar panel array system comprising:
   a) an A-Frame comprising:
      i) a forward beam extending from a base to a top;
      ii) a trailing beam extending from a base to a top, and coupled to said forward beam proximal to said top of the forward beam;
      wherein the base of the forward beam is configured a width from the base of the trailing beam and wherein the base of the forward beam is configured forward from the trailing beam;
   b) panel-supports; and
   c) a solar panel array comprising:
      iii) a plurality of forward solar panels coupled to the forward beam between the base and the top of the forward beam;
      wherein each of said plurality of forward solar panels are coupled to the forward beam by one of said panel-supports and with a beam-offset distance, wherein a first forward solar panel is configured a beam-offset distance from a second forward solar panel of said plurality of forward solar panels; and
      iv) a plurality of trailing solar panels coupled to the trailing beam between the base and the top of the trailing beam; and
   wherein each of said plurality of trailing solar panels are coupled to the trailing beam by one of said panel-supports and with a beam-offset distance, wherein a first trailing solar panel is configured a beam-offset distance from a second trailing solar panel of said plurality of trailing solar panels;
   d) a solar panel actuator configured to rotate the panel-supports to rotate each of the plurality of forward solar panels and each of the plurality of trailing solar panels.

3. The A-Frame solar panel array system of claim 2, wherein the solar panel actuator is configured to rotate each of the plurality of forward and trailing solar panels of the solar panel array from about the panel-supports.

4. The A-Frame solar panel array system of claim 1, further comprising:
   a forward solar panel actuator; and
   a trailing solar panel actuator;
   wherein each of the plurality of forward solar panels are coupled to the forward beam by a forward panel-support, and wherein each of the plurality of trailing solar panels are coupled to the trailing beam by a trailing panel-support; and
   wherein the forward solar panel actuator is configured to rotate each of the forward panel-supports to rotate each of the plurality of forward solar panels, and wherein the trailing solar panel actuator is configured to rotate each of the trailing panel-supports to rotate each of the plurality of trailing solar panels.

5. The A-Frame solar panel array system of claim 1, further comprising:
   a) a plurality of forward solar panel actuators; and
   b) a plurality of trailing solar panel actuators;
   wherein each of the plurality of forward solar panels are coupled with a forward panel-support, and wherein each of the plurality of trailing solar panels are coupled with a trailing panel-support, and
   wherein each forward panel-support is coupled with one of the plurality of forward solar panel actuators and configured to be rotated by said forward solar panel actuator, and
   wherein each trailing panel-support is coupled with one of the plurality of trailing solar panel actuators and configured to be rotated by said trailing solar panel actuator.

6. The A-Frame solar panel array system of claim 1, comprising a plurality of A-frames configured in an A-Frame array, wherein a first A-Frame is configured an offset distance from a second A-Frame along a length axis of the A-Frame array.

7. The A-Frame solar panel array system of claim 6, wherein each of the panel-supports extend from the first A-Frame to the second A-Frame.

8. An A-Frame solar panel array system comprising:
   a) a plurality of A-Frames each comprising:
      i) a forward beam extending from a base to a top;
      ii) a trailing beam extending from a base to a top, and coupled to said forward beam proximal to said top of the forward beam;

wherein the base of the forward beam is configured a width from the base of the trailing beam and wherein the base of the forward beam is configured forward from the trailing beam;
b) panel-supports; and
c) a solar panel array comprising:
   iii) a plurality of forward solar panels coupled to the forward beam between the base and the top of the forward beam;
   wherein each of said plurality of forward solar panels are coupled to the forward beam by one of said panel-supports and with a beam-offset distance, wherein a first forward solar panel is configured a beam-offset distance from a second forward solar panel of said plurality of forward solar panels; and
   iv) a plurality of trailing solar panels coupled to the trailing beam between the base and the top of the trailing beam; and
   wherein each of said plurality of trailing solar panels are coupled to the trailing beam by one of said panel-supports and with a beam-offset distance, wherein a first trailing solar panel is configured a beam-offset distance from a second trailing solar panel of said plurality of trailing solar panels;
   wherein the plurality of A-frames are configured in an A-Frame array, wherein a first A-Frame is configured an offset distance from a second A-Frame along a length axis of the A-Frame array;
   wherein each of the panel-supports and extend from the first A-Frame to the second A-Frame;
d) a solar panel actuator, wherein the solar panel actuator is configured to rotate each of the panel-supports to rotate each of the plurality of forward solar panels and each of the plurality of trailing solar panels.

9. The A-Frame solar panel array system of claim 8, further comprising:
a) a forward-solar panel actuator; and
b) a trailing-solar panel actuator;
   wherein the forward-solar panel actuator is configured to rotate the each of the panel-supports extending between the first A-Frame and the second A-Frames on a forward side to rotate each of the plurality of forward solar panels, and
   wherein the trailing-solar panel actuator is configured to rotate the each of the panel-supports extending between the first A-Frame and the second A-Frames on a trailing side to rotate each of the plurality of trailing solar panels.

10. The A-Frame solar panel array system of claim 9, wherein the plurality of forward solar panels and the plurality of trailing solar panels are configured between the plurality of A-Frames.

11. The A-Frame solar panel array system of claim 8, wherein the panel-supports comprise:
a) forward panel-supports; and
b) trailing panel-supports;
   wherein the forward panel-supports extend between each forward beam of the plurality of A-Frames connecting each of said forward beam;
   wherein the trailing-panel-supports extend between each trailing beam of the plurality of A-Frames connecting each of said trailing beam; and
   wherein at least two of the plurality of forward solar panels are coupled to each forward panel-support, and wherein at least two of the plurality of trailing solar panels are coupled to each trailing panel-support.

12. The A-Frame solar panel array system of claim 1, further comprising a mister system comprising a mister port configured to produce a water mist over the solar panel array to reduce a temperature of the plurality of forward solar panels and plurality of trailing solar panels.

13. The A-Frame solar panel array system of claim 12, wherein the mister system comprises:
a) a mister support frame coupled to the A-Frame; and
b) a plurality of mister ports; and
c) a water conduit that extends to each of said plurality of mister ports.

14. The A-Frame solar panel array system of claim 13, wherein the mister support frame forms an outer perimeter with three or more of the plurality of mister ports attached to the outer perimeter.

15. The A-Frame solar panel array system of claim 13, further comprising:
a water pump configured to pump water through the water conduit to the plurality of mister ports; and
a battery that is charged by the plurality of forward solar panels and the plurality of trailing solar panels and wherein said battery provides power to said pump.

16. The A-Frame solar panel array system of claim 1, wherein each of the plurality of forward solar panels and each of the plurality of trailing solar panels have a solar panel height that is substantially the same,
and wherein each forward panel-support is configured a vertical offset distance from each trailing panel-support that is greater than or equal to the solar panel height.

17. The A-Frame solar panel array system of claim 1, comprising three or more forward solar panels coupled to the forward beam, and comprising three or more trailing solar panels coupled to the trailing beam.

18. The A-Frame solar panel array system of claim 17, comprising three or more forward beams and comprising three or more trailing beams and wherein each of the plurality of forward solar panels are configured on a panel-support of the panel-supports between the forward beams, and
   wherein each of the plurality of trailing solar panels are configured on a panel-support of the panel-supports between the trailing beams.

19. The A-Frame solar panel array system of claim 1, wherein each A-Frame further comprises a center beam extending from a base to a top and coupled to both the top of the forward beam and the top of the trailing beam.

* * * * *